US007307771B2

(12) United States Patent
Foote (10) Patent No.: US 7,307,771 B2
(45) Date of Patent: Dec. 11, 2007

(54) GIMBAL WITH ORBITING MIRROR

(75) Inventor: Michael D. Foote, North Andover, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 11/344,993

(22) Filed: Feb. 1, 2006

(65) Prior Publication Data

US 2007/0177288 A1    Aug. 2, 2007

(51) Int. Cl.
*G02B 26/08* (2006.01)
*G01S 17/66* (2006.01)
(52) U.S. Cl. .................... 359/225; 359/863; 250/203.1
(58) Field of Classification Search ................ 359/201, 359/225, 226, 405, 807, 863, 223; 250/202, 250/203.1, 203.6; G02B 26/08
See application file for complete search history.

(56) References Cited

U.S. PATENT DOCUMENTS

| 4,015,905 | A   |   | 4/1977  | Lloyd .......................... 356/248 |
|-----------|-----|---|---------|------------------------------------------|
| 5,717,512 | A   | * | 2/1998  | Chmielewski et al. ...... 359/210 |
| 5,805,325 | A   | * | 9/1998  | Clune .......................... 359/226 |
| 5,867,317 | A   | * | 2/1999  | Elie et al. ................... 359/555 |
| 6,129,307 | A   | * | 10/2000 | Deoms et al. ............. 244/3.16 |
| 6,296,362 | B1  | * | 10/2001 | Tinti et al. .................. 359/871 |
| 6,484,978 | B2  |   | 11/2002 | Voigt et al. ............... 248/182.1 |
| 6,576,891 | B2  | * | 6/2003  | Ansley ........................ 250/234 |
| 6,720,682 | B2  |   | 4/2004  | Hatam-Tabrizi et al. ...... 310/12 |
| 6,894,818 | B1  | * | 5/2005  | Cicchiello et al. .......... 359/223 |
| 2003/0098387 | A1 |   | 5/2003  | Baumann et al. .......... 244/3.13 |
| 2004/0065810 | A1 |   | 4/2004  | Casteleiro .................... 250/216 |
| 2004/0218287 | A1 |   | 11/2004 | Casteleiro .................... 359/819 |

OTHER PUBLICATIONS

FAS/Intelligence Resource Program, Cobra Eye, www.fas.org/irp/program/collect/cobra_eye.htm.
Lincoln Laboratory Journal, "The Optical Aircraft Measurements Program and Cobra Eye", vol. 13. No. 1. 2002, pp. 181-203.

* cited by examiner

*Primary Examiner*—Stephone B. Allen
*Assistant Examiner*—Mark Consilvio
(74) *Attorney, Agent, or Firm*—BainwoodHuang (57) ABSTRACT

A gimbal for a gimbaled mirror optical sensor system includes a mirror support rotatable about a first axis along which an optical sensor suite lies, the first axis being spaced apart from a desired pivot point of a variable line of sight, which may be for example a fixed-size window in the outer wall of an aircraft. The gimbal further includes two generally planar mirrors supported by and rotatable with the mirror support. A first mirror is spaced apart from the optical sensor suite along the first axis and is non-orthogonal to the first axis so as to reflect light from a second axis to the optical sensor suite, wherein the second axis sweeps an arcuate path about the first axis upon rotation of the mirror support. A second mirror lies along the second axis so as to follow the arcuate path upon rotation of the mirror support. The second mirror is pivotable so as to reflect light from the variable line of sight to the first mirror along the second axis. A motion control subsystem controls the rotation of the mirror support and the pivoting of the second mirror such that the variable line of sight pivots about the desired pivot point.

14 Claims, 7 Drawing Sheets

GIMBAL WITH ORBITING MIRROR

BACKGROUND

Gimbaled mirror systems are used to steer a line of sight for pointing and tracking in optical sensor systems. The system controls the orientation of a tracking mirror which reflects the incoming light from a variable line of sight (LOS) into a fixed input (in position and angle) of a collection of optical sensor equipment referred to as an "optical sensor suite". Common configurations place the fixed sensor suite input along a vertical or horizontal direction. In a mobile platform such as an aircraft, for example, the mirror system may be mounted adjacent to a window of an outer wall of the aircraft.

For a traditional gimbaled-mirror tracking system, there is a tradeoff among the following aspects of the system:
  Field of regard (the angular view range forward, back, up, down)
  Aperture (beam size)
  Window size It is generally desirable for field of regard and aperture to be as large as possible, and for the window size to be as small as possible. The field of regard (FOR) is the total set of look-angles the system can see. A larger FOR gives a more capable and flexible system, with fewer operational constraints. A larger aperture gives a stronger optical signal and greater resolution. A smaller window makes integration of the tracking system simpler and less expensive.

In many cases, there are hard constraints on window size. For example, windows may need to fit between structural aircraft ring frames. Some optical materials are not available in large panes. At a minimum, large windows are more expensive, often prohibitively so. Some systems have an uncovered opening or cavity instead of a window, and in such systems the opening should be as small as possible for reasons of aerodynamics.

It has been known in the prior art to use a translation stage to move the entire optical system as part of the tracking operation. Such a translation stage may be very large, because the overall optical system will often weight thousands of pounds. It may also be difficult in such a system to coordinate multiple sensor channels, because each must be on a separate translation stage, or their relative motion must be coordinated.

SUMMARY

One important cause of the above-described tradeoff among field of regard (FOR), aperture size, and window size is that the pivot point for the line of sight in tracking systems is often on the face of a rotating tracking mirror that is necessarily spaced apart from the window. As the look angle changes, the line of sight sweeps in an arc with the fixed pivot point at its apex. At the extremes of the arc, the opaque wall surrounding the window acts to reduce the effective aperture size. While this effect can be reduced by placing the tracking mirror as close to the window as possible, in any practical system there is some minimum spacing imposed by the size and configuration of the mirror supports and other elements of the overall system.

Disclosed is a new concept for a gimbal of an optical tracking sensor which overcomes performance constraints of traditional gimbals. A disclosed gimbal includes a mirror support that is rotatable about a first axis along which an optical sensor suite lies, the first axis being spaced apart from a desired pivot point of a variable line of sight, which may be for example a fixed-size window in the outer wall of an aircraft. The gimbal further includes two generally planar mirrors supported by and rotatable with the mirror support. A first mirror is spaced apart from the optical sensor suite along the first axis and is non-orthogonal to the first axis so as to reflect light from a second axis to the optical sensor suite, wherein the second axis sweeps an arcuate path about the first axis upon rotation of the mirror support. A second mirror lies along the second axis so as to follow the arcuate path upon rotation of the mirror support. The second mirror is pivotable so as to reflect light from the variable line of sight to the first mirror along the second axis. A motion control subsystem controls the rotation of the mirror support and the pivoting of the second mirror such that the variable line of sight pivots about the desired pivot point.

By maintaining the desired pivot point of the line of sight away from the rotational axis of the mirror support, the gimbal can achieve better trade-offs among aperture size, window size and field of regard. The line of sight can be kept away from opaque structure surrounding a window, so that aperture size is not compromised at larger viewing angles. Further, this effect can be achieved without requiring unduly small gimbal-to-window spacing, giving system designers more flexibility in the size, placement and configuration of various components of the overall system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
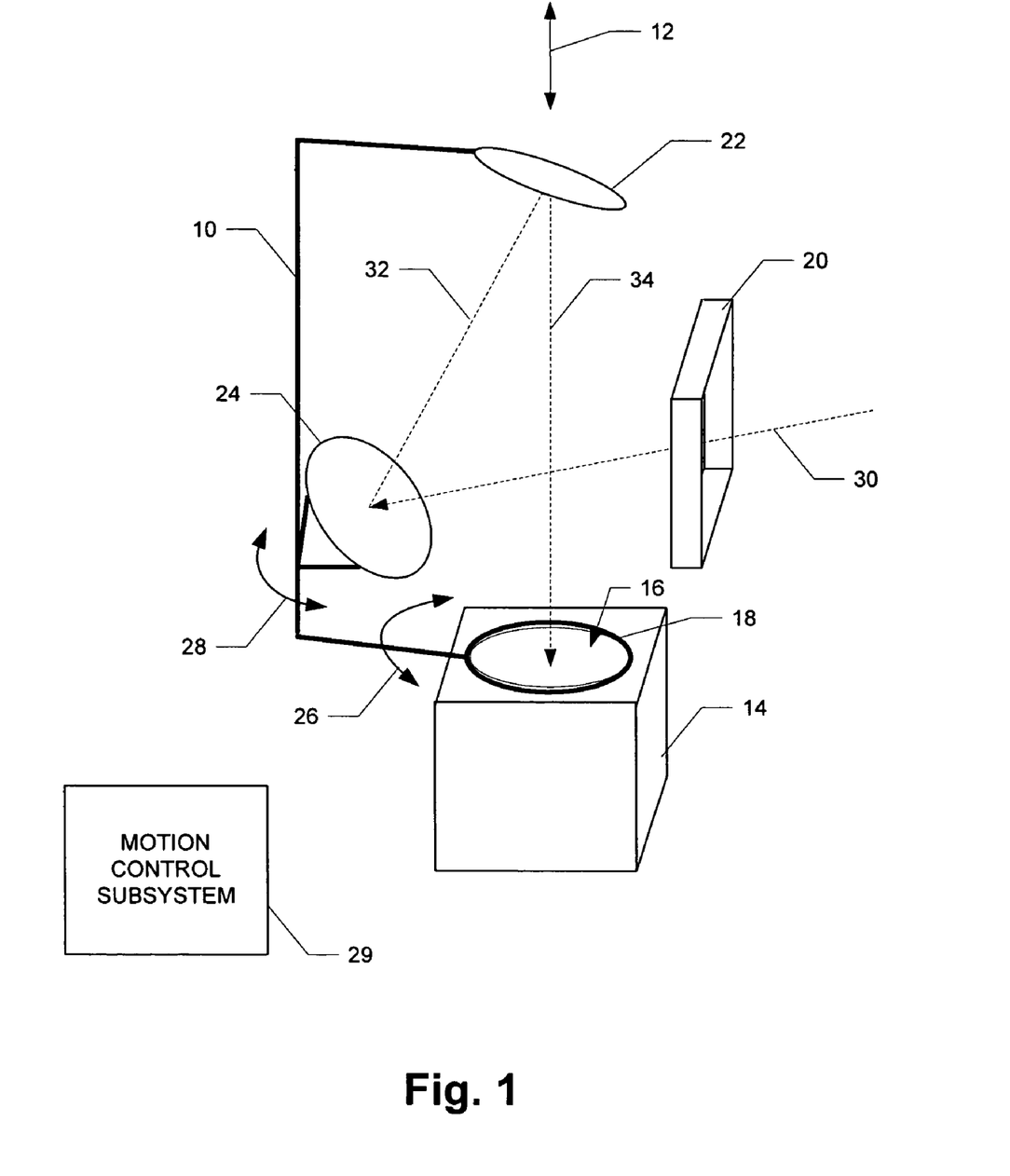
FIG. 1 is a schematic perspective view of showing a gimbal of an optical sensor system in accordance with the present invention.

In the schematic view of FIG. 1, a gimbaled mirror optical sensor system includes a rigid support 10 that is rotatable about a rotation axis 12 along which lies a "sensor suite" housing 14, which may include for example a collection of optical sensors and sensor signal processing circuitry. The sensor suite housing 14 includes an opening 16 for the passage of optical signals. In the exemplary configuration of FIG. 1, the gimbal support 10 has a round lower portion 18 mechanically coupled to the sensor suite housing 14 such as by a circular bearing. As shown the optical sensor system may be placed adjacent to (and slightly spaced apart from) a window 20 such as may be formed in an outer wall of an aircraft, for example.

Attached to the gimbal support 10 are a fixed axial mirror 22 and an orbital mirror 24, both of which are generally planar. The axial mirror 22 rotates about the rotational axis 12, which is also the axis along which the optical input signals to the sensors within the sensor suite housing 14 travel. The axial mirror 22 is mounted with a small, permanent angle between its normal and the rotational axis 14, such that light received from the orbital mirror 24 is reflected along the rotational axis 14 to the opening 16 of the sensor suite housing 14. The orbital mirror 24 is attached to the gimbal support 10 away from the rotational axis 12, such that it travels along an arcuate or orbital path around the rotational axis 12, as indicated by arrow 26. The orbital mirror 24 and the axial mirror 22 rotate together such that the axial mirror 22 is always positioned to relay the incoming beam from the orbital mirror 24 to the sensors within the sensor suite housing 14.

In the present description, motion in a direction parallel to the rotational axis 12 is described as "vertical" or "elevational" motion, and motion in a plane perpendicular to the rotational axis 12 is described as "rotational" or "azimuthal". Additionally, azimuthal motion is in some cases described using clock positions with respect to the rotational axis 12 when the system is viewed from above. It is to be understood that these terms are utilized primarily for ease of description and not to imply any particular spatial orientation of the optical sensor system or its components.

The orbital mirror 24 is capable of pivoting in at least an elevational direction as indicated by an arrow 28, and is preferably capable of at least limited azimuthal motion as well. These relatively fine motions of the orbital mirror 24 as well as the relatively coarse rotational motion of the support 10 are controlled by a motion control subsystem 29. It may be convenient in some embodiments for the motion control subsystem 29 to be located near or even within the sensor suite housing 14, whereas in other embodiments at least some of the motion control subsystem 29 may be located more remotely. It will be appreciated that the motion control subsystem 29 generally includes motors and rotary position encoders that are mechanically coupled to the various moving parts such as the support 10 and the orbital mirror 24, as well as motion control circuitry coupled by wires, optical fibers, and/or other electrical or optical coupling components.

FIG. 1 illustrates the path of an optical beam within the gimbal. The optical beam enters the gimbal from the side along a "line of sight" 30, such as through a window 20 or similar aperture. The incident beam is reflected from the orbital mirror 24 along an axis 32 to the axial mirror 22, and then reflected from the axial mirror 22 along an axis 34 (co-incident with the rotational axis 12) to the opening 16 of the sensor suite housing 14. It will be appreciated that the location and orientation of the axis 34 is substantially constant. The axis 32 has a constant elevational angle and sweeps along an arcuate azimuthal path with rotation of the support 10 about the rotational axis 12. The elevational and azimuthal orientation of the line of sight 30 is a function of the rotational position of the support 10 and the elevational orientation of the orbital mirror 24, as well as any finer azimuthal positioning of the orbital mirror 24 that may be employed. Thus, the optical sensor system can be controlled to sweep the line of sight 30 in both the elevational and azimuthal directions to effect scanning or object tracking.

Figure 2:
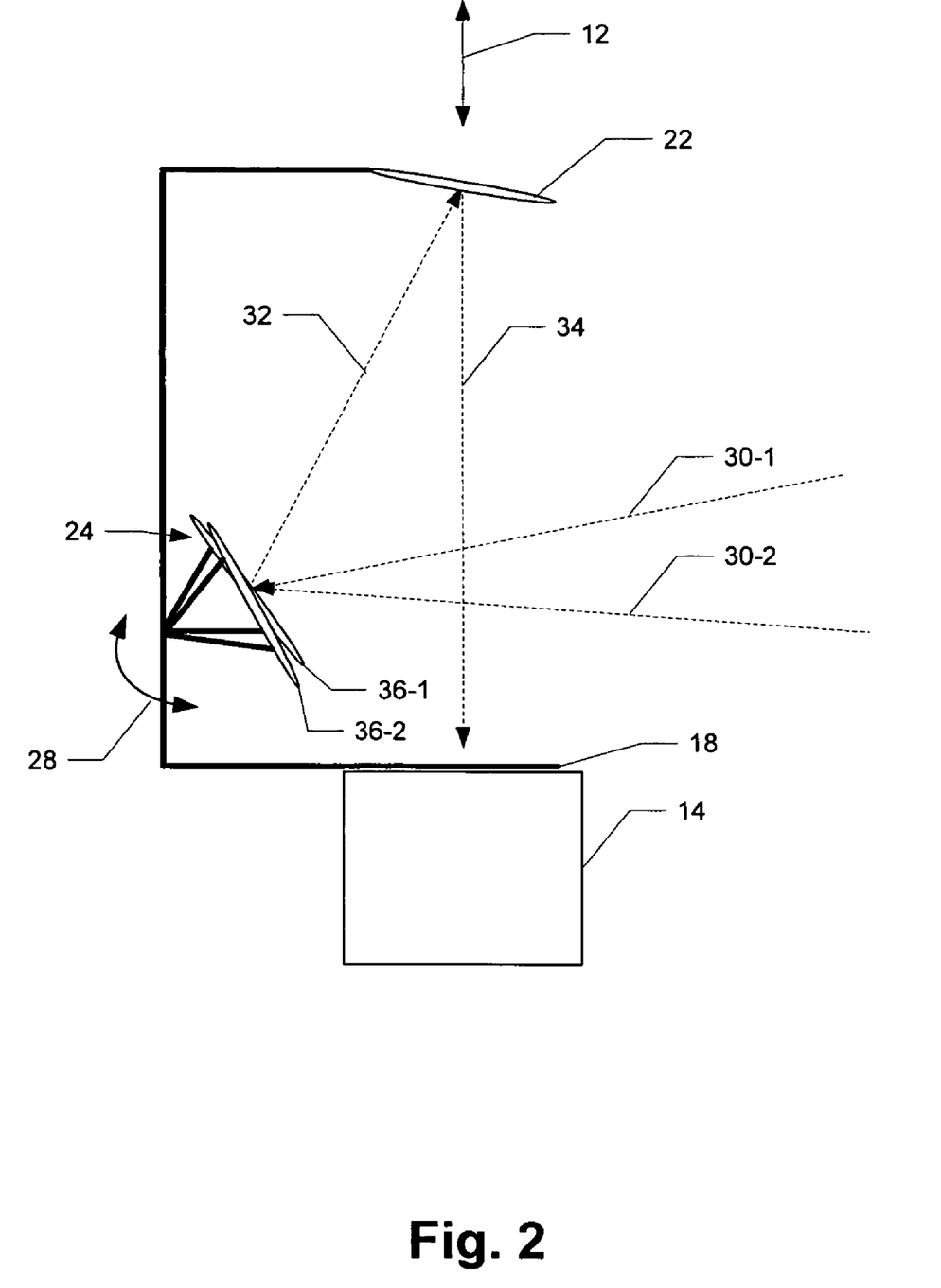
FIG. 2 is a side schematic view of the gimbal of FIG. 1.

FIG. 2 shows a side view of the system of FIG. 1. This Figure illustrates the elevational motion of the line of sight 30. A first elevational position 36-1 of the orbital mirror 24 yields a first line of sight 30-1 at an elevation of about −80 degrees from the upward vertical direction. A second elevational position 36-2 of the orbital mirror 24 yields a second line of sight 30-2 at an elevation of about −100 degrees from the upward vertical direction.

Figure 3:
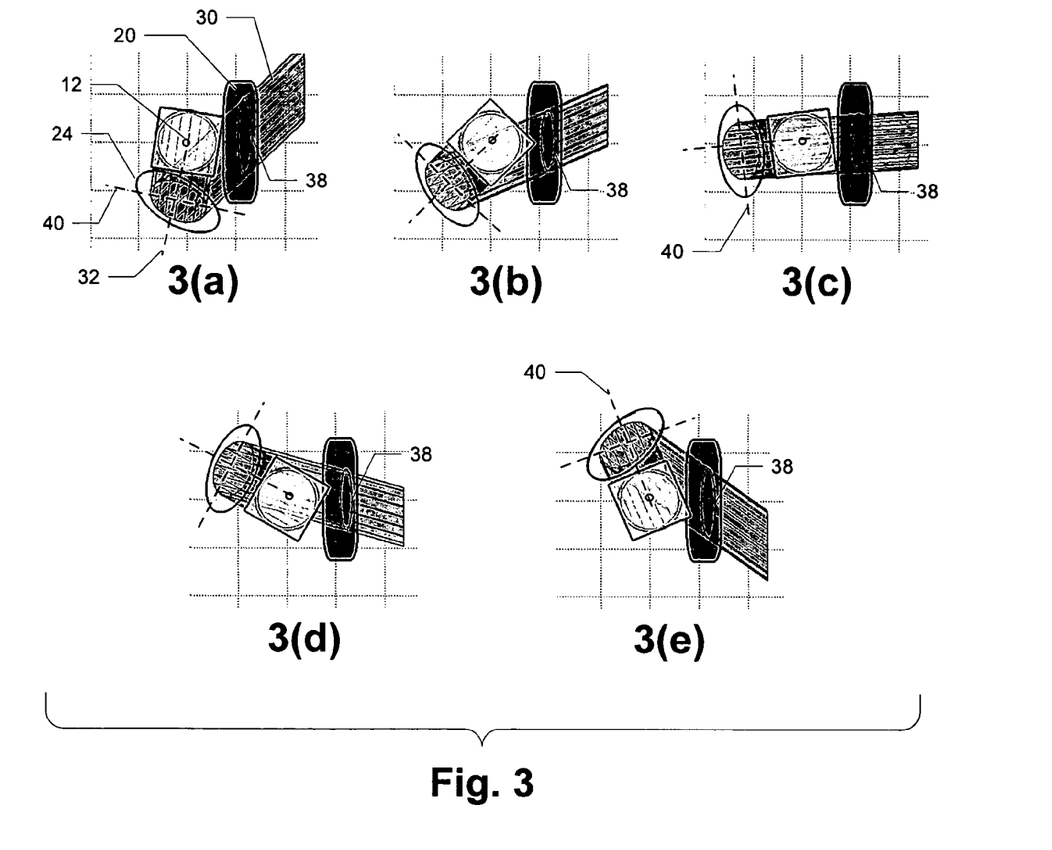
FIG. 3 (consisting of FIGS. 3(a), 3(b), 3(c), 3(d), and 3(e)) is a series of top schematic views of the gimbal of FIG. 1 illustrating its tracking motion.

FIG. 3 shows the azimuthal motion of the line of sight 30 as the orbital mirror 24 rotates about the rotational axis 12 (FIG. 2), which is orthogonal to the page in FIG. 3. It will be noted that the location 38 at which the line of sight 30 intersects the window 20 remains substantially constant throughout the range of azimuthal motion. Thus the location 38 can be viewed as a pivot point of the line of sight 30. This effect is provided in part by an azimuthal pivoting of the orbital mirror 24 that occurs as it is rotated about the rotational axis 12. In the rotational position shown in FIG. 3(a), the orbital mirror 24 is pivoted slightly clockwise with respect to a line 40 which is perpendicular to the axis 32 between the orbital mirror 24 and the axial mirror 22. As rotation progresses through the positions shown in FIGS. 3(b)-3(e), the orbital mirror 24 is pivoted in the counter-clockwise direction, toward an opposite extreme pivotal position as shown in FIG. 3(e).

Figure 4:
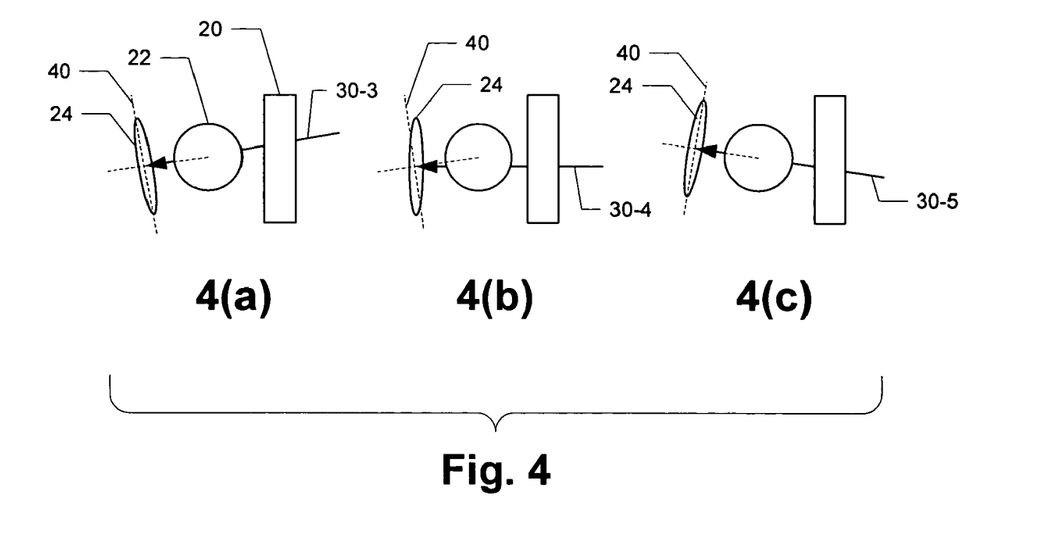
FIG. 4 (consisting of FIGS. 4(a), 4(b), and 4(c)) is a series of top schematic views of the gimbal of FIG. 1 illustrating its motion when a line of sight is in the neighborhood of perpendicular to an adjacent window.
Figure 5:
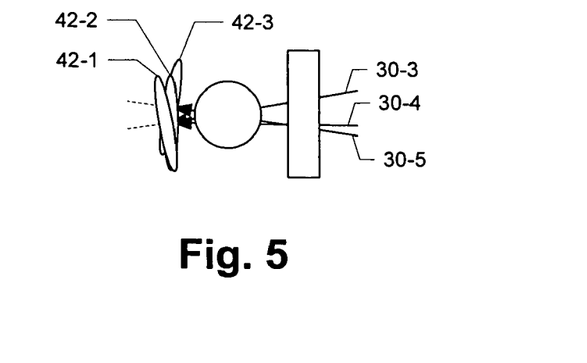
FIG. 5 is a composite top schematic view in which the positions of FIGS. 4(a) through 4(c) are superimposed.

FIGS. 4 and 5 illustrate in somewhat exaggerated fashion a technique that may be employed to yield a slightly larger vertical extent of the FOR in the middle of the azimuthal range. When the orbital mirror 24 is in this region of its travel, the orbital mirror 24 is pivoted slightly in lieu of further rotation about the rotational axis 12, in order to keep the orbital mirror 24 closer to the window to increase elevational coverage. In the example of FIG. 4, it is assumed that the line of sight 30 is sweeping in the clockwise direction. In FIG. 4(a), the orbital mirror 24 is at a position just before the 9 o'clock position. At this point, rotation of the orbital mirror 24 about the rotational axis 12 is stopped, and further clockwise motion of the line of sight 30 is achieved by pivoting the orbital mirror 24 with respect to the line 40 in a clockwise direction. Once the line of sight 30 reaches a predetermined angle, such as approximately orthogonal to the window 20 as shown, the orbital mirror 24 is very quickly rotated to a position beyond the 9 o'clock position, and simultaneously it is pivoted counter-clockwise so as to become more parallel to the line 40. By this action, a small range of viewing angles in the neighborhood of the 9 o'clock position of the orbital mirror 24 are avoided, while the scanning/tracking of specific areas/objects is maintained.

FIG. 5 illustrates the three positions of FIGS. 4(a)-4(c) in a superimposed fashion. The positions 42-1, 42-2 and 42-3 of the orbital mirror 24 correspond to the views of FIGS. 4(a), 4(b), and 4(c) respectively.

Figure 6:
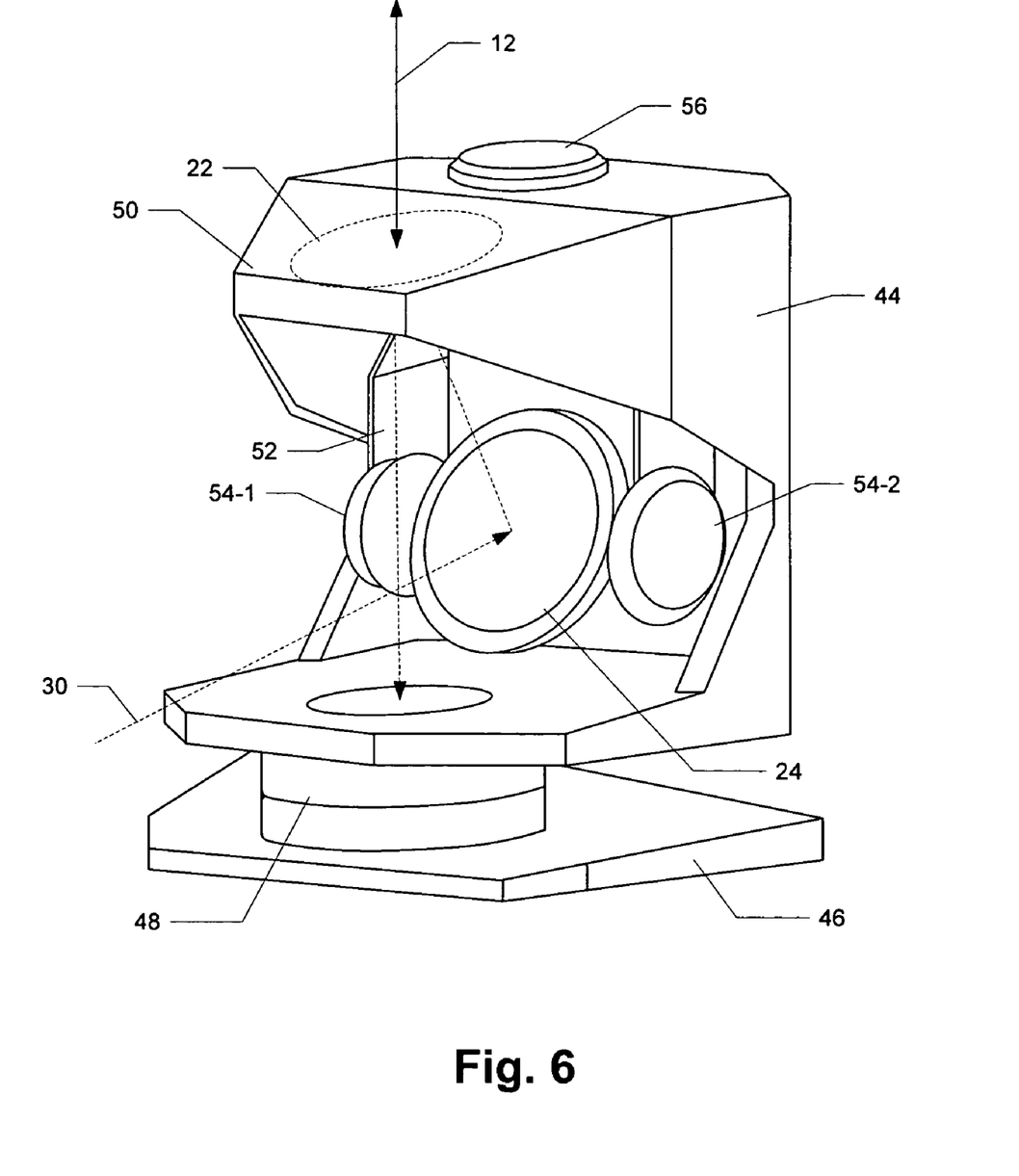
FIG. 6 is a perspective view of an exemplary physical embodiment of the gimbal of FIG. 1.

FIG. 6 shows one potential physical embodiment of the disclosed gimbal. A generally C-shaped housing 44 is mounted to a pedestal 46 via a first motor assembly 48 which effects rotation of the housing 44 about the rotational axis 12. The axial mirror 22 (shown in phantom) is mounted to the underside of a slanted upper portion 50 of the housing 44. The orbital mirror 24 is mounted to an inverted yoke assembly 52 via a pair of second motor assemblies 54-1 and 54-2 which effect elevational pivoting of the orbital mirror 24. The yoke assembly 52 is mounted to the top of the housing 44 via a third motor assembly 56 that effects azimuthal pivoting of the orbital mirror 24. The various motor assemblies 48, 54 and 56 are controlled by separate motion control circuitry (not shown) forming part of the overall optical tracking system.

The embodiment of FIG. 6 includes a variety of details that may be different or entirely omitted in alternative embodiments. In particular, in FIG. 6 the housing 44 is supported from below and the yoke assembly 52 is supported from above. In alternative embodiments, either or both of these mounting arrangements may be changed such that, for example, an overall gimbal housing may be supported from above while a separate yoke assembly, if used, may be supported either from above or from below. Other configurations are also possible.

Figure 7:
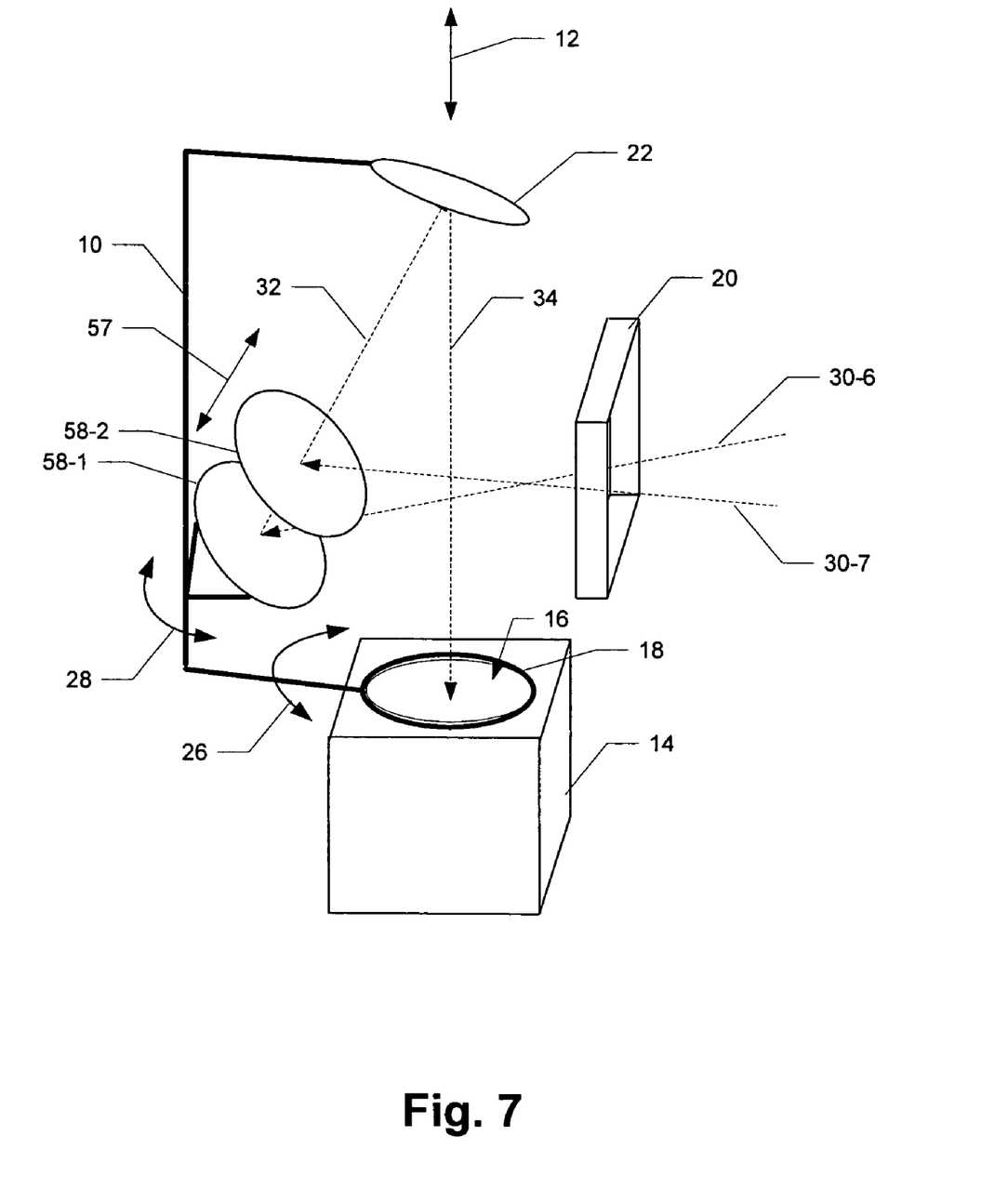
FIG. 7 is a perspective schematic view of an elevation-extension variant of the gimbal of FIG. 1.

FIG. 7 shows a variation of the gimbal configuration that can be used to significantly increase elevational coverage. In addition to its elevational pivoting motion, the orbital mirror 24 is also moved in the vertical (elevational) direction. In the illustrated embodiment, the orbital mirror 24 is moved along the axis 32 as indicated by arrows 57, which has the effect of changing the vertical location of the orbital mirror 24 while maintaining a substantially fixed angular relationship between the axis 32 and the axis 34. Two positions 58-1 and 58-2 of the orbital mirror 24 are shown. As the orbital mirror 24 is moved from the lower position 58-1 to the higher position 58-2, the line of sight rotates from a more upward-looking line of sight 30-6 to a more downward-looking line of sight 30-7.

Figure 8:
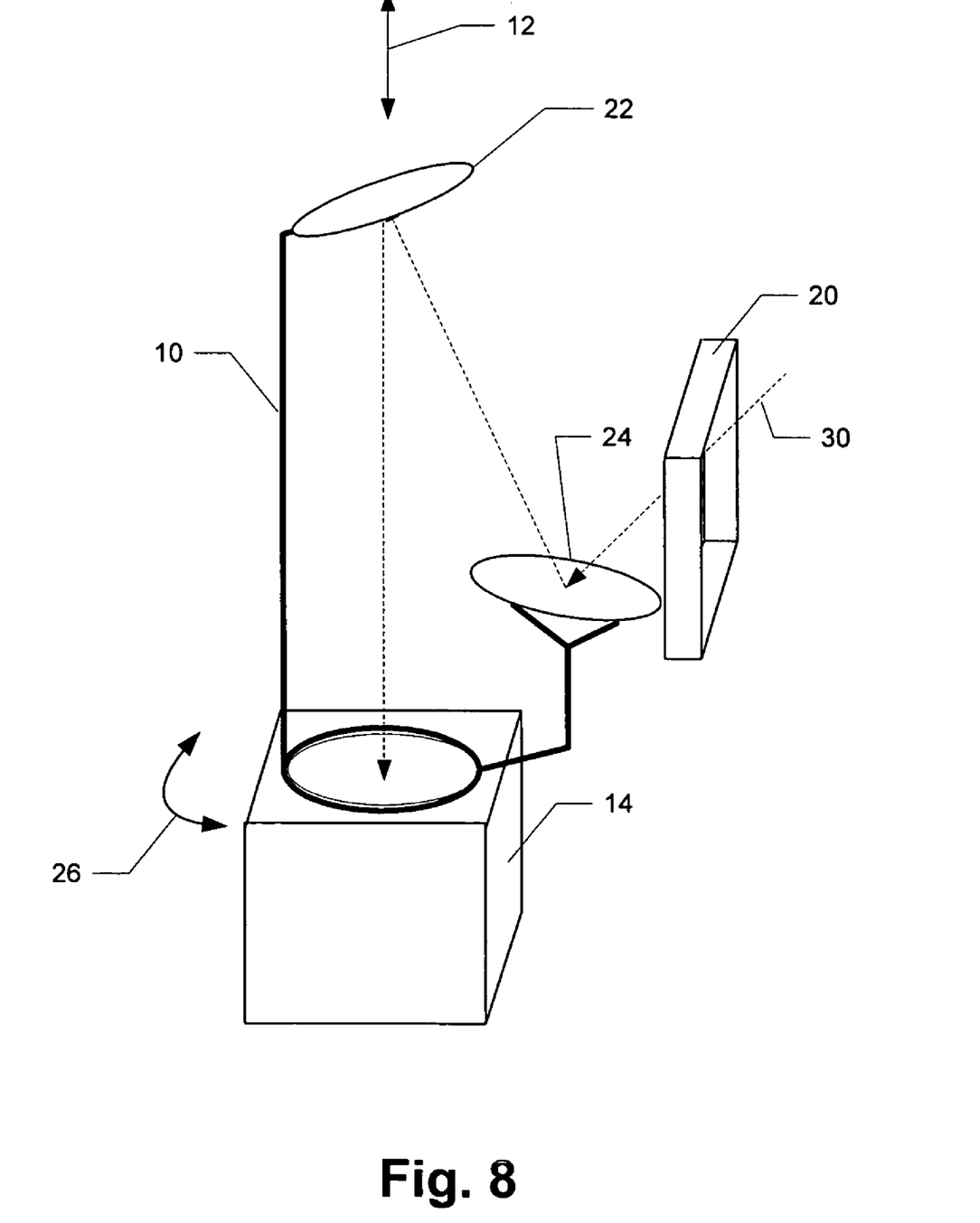
FIG. 8 is a perspective schematic view of an outboard-mirror variant of the gimbal of FIG. 1.

FIG. 8 shows an alternative configuration, one in which the orbital mirror 24 is located between the rotational axis 12 and the window 20. This configuration may be referred to as "outboard" (i.e., toward the outside) placement of the orbital mirror 24 in contrast to the "inboard" placement of FIG. 1, for example. This configuration can be used when it is desirable to view along lines of sight having large upward or downward elevational angles, this being enabled by the close spacing between the window 20 and the orbital mirror 24.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A gimbal for use in a gimbaled mirror optical sensor system, comprising:
   a mirror support rotatable about a first axis along which an optical sensor suite lies, the first axis being spaced apart from a desired pivot point of a variable line of sight in an azimuthal direction perpendicular to the first axis;
   a generally planar first mirror supported by the mirror support and spaced apart from the optical sensor suite along the first axis, the first mirror being non-orthogonal to the first axis and rotatable with the mirror support so as to reflect light from a second axis to the optical sensor suite, the second axis sweeping an arcuate path about the first axis upon rotation of the mirror support;
   a generally planar second mirror supported by the mirror support along the second axis so as to follow the arcuate path upon rotation of the mirror support, the second mirror being pivotable with respect to the mirror support in the azimuthal direction so as to reflect light from the variable line of sight to the first mirror along the second axis; and
   a motion control subsystem operative to control the rotation of the mirror support and the azimuthal pivoting of the second mirror such that the variable line of sight pivots substantially about the desired pivot point in the azimuthal direction,
   the gimbal having an outboard configuration in which the distance from the first axis to the desired pivot point is generally greater than the distance from the desired pivot point to the second mirror.

2. A gimbal according to claim 1, wherein the motion control subsystem is operative to avoid a small range of azimuthal rotational angles of the second mirror in the middle of an azimuth range so as to increase an elevational extent of a field of regard of the gimbaled mirror optical sensor system.

3. A gimbal according to claim 2, wherein the motion control subsystem is operative to perform azimuthal pivoting of the second mirror in lieu of rotation of the second mirror about the rotational axis in the small range of rotational angles.

4. A gimbal according to claim 1, wherein the mirror support comprises a generally C-shaped body.

5. A gimbal according to claim 1, wherein the mirror support comprises a yoke for supporting the second mirror, the yoke being pivotable in the azimuthal direction to effect azimuthal pivoting of the second mirror, and the yoke being coupled to the second mirror by a motor assembly operative to effect elevational pivoting of the second mirror.

6. A gimbal according to claim 1, wherein the second mirror is capable of elevational motion with respect to the mirror support so as to increase the elevational range of a field of regard of the gimbaled mirror optical sensor system.

7. A gimbal according to claim 6, wherein the elevational motion of the second mirror is along the second axis.

8. A gimbal for use in a gimbaled mirror optical sensor system, comprising:
   a mirror support rotatable about a first axis along which an optical sensor suite lies, the first axis being spaced apart from a desired pivot point of a variable line of sight;
   a generally planar first mirror supported by the mirror support and spaced apart from the optical sensor suite along the first axis, the first mirror being non-orthogonal to the first axis and rotatable with the mirror support so as to reflect light from a second axis to the optical sensor suite, the second axis sweeping an arcuate path about the first axis upon rotation of the mirror support;
   a generally planar second mirror supported by the mirror support along the second axis so as to follow the arcuate path upon rotation of the mirror support, the second mirror being pivotable so as to reflect light from the variable line of sight to the first mirror along the second axis; and
   a motion control subsystem operative to control the rotation of the mirror support and the pivoting of the second mirror such that the variable line of sight pivots substantially about the desired pivot point,
   wherein the gimbal has an inboard configuration in which the distance from the first axis to the desired pivot point is generally less than the distance from the desired pivot point to the second mirror.

9. A gimbal according to claim 8, wherein the motion control subsystem is operative to avoid a small range of rotational angles of the second mirror in the middle of an azimuth range so as to increase an elevational extent of a field of regard of the gimbaled mirror optical sensor system.

10. A gimbal according to claim 9, wherein the motion control subsystem is operative to perform azimuthal pivoting of the second mirror in lieu of rotation of the second mirror about the rotational axis in the small range of rotational angles.

11. A gimbal according to claim 8, wherein the mirror support comprises a generally C-shaped body.

12. A gimbal according to claim 8, wherein the mirror support comprises a yoke for supporting the second mirror, the yoke being pivotable in the azimuthal direction to effect azimuthal pivoting of the second mirror, and the yoke being coupled to the second mirror by a motor assembly operative to effect elevational pivoting of the second mirror.

13. A gimbal according to claim 8, wherein the second mirror is capable of elevational motion with respect to the mirror support so as to increase the elevational range of a field of regard of the gimbaled mirror optical sensor system.

14. A gimbal according to claim 13, wherein the elevational motion of the second mirror is along the second axis.

* * * * *